Sept. 23, 1941.  A. M. YOUNG  2,256,918
AIRCRAFT
Filed Aug. 12, 1939  3 Sheets-Sheet 1

INVENTOR
ARTHUR M. YOUNG.
BY
Harry C. Hart
ATTORNEY

Sept. 23, 1941.　　　A. M. YOUNG　　　2,256,918
AIRCRAFT
Filed Aug. 12, 1939　　　3 Sheets-Sheet 3

INVENTOR
ARTHUR M. YOUNG.
BY
Harry C. Hart
ATTORNEY

Patented Sept. 23, 1941

2,256,918

UNITED STATES PATENT OFFICE 2,256,918

AIRCRAFT

Arthur M. Young, Paoli, Pa.

Application August 12, 1939, Serial No. 289,719

24 Claims. (Cl. 244—17)

This invention relates to aircraft, and particularly to aircraft of the rotary wing type in which one and the same airscrew provides both sustentation and propulsion. It has for its object the provision of a helicopter which shall be capable of flight in a vertical or a horizontal direction or in any direction in between; which shall be capable of widely variable speeds in any direction of flight and easily manoeuvreable.

In the past, a number of attempts have been made to construct helicopters having these desirable properties, but all these attempts have met with difficulties. A particularly serious difficulty has had to do with the combination of "pitch-change" of the blades of the rotary liftscrew or airscrew (conveniently termed "rotor") for variation in lift and "feathering" for variation in horizontal flight.

A helicopter must necessarily be provided with some means for regulating the pitch, or average angle of attack of the liftscrew blades. This requirement comes about through the fact that in a climb the angle of attack of each blade with respect to the air is diminished and in descent it is increased due to the relative motion of the air and the blades. The range of angles in which the blades operate with aerodynamic efficiency is quite small, and therefore if there is to be a substantial range of speeds for vertical ascent and descent, the setting of the blades with respect to the plane of rotation of the liftscrew must be alterable in order to keep the angles of attack with respect to the air the same or nearly the same and permit all the blades to operate efficiently under varying conditions of vertical motion. Angle changes of this kind, which take place for all the blades together, I term "pitch-changes."

In a machine of the type in question, horizontal flight is usually attained by tipping either the actual or the virtual axis of the liftscrew forward for forward flight, and generally, in the direction of the desired locomotion. When the virtual axis is tipped forward, for example, for forward flight, the angle of attack of the advancing blade is diminished and that of the retreating blade increased, which results in forward motion of the craft. Such changes are differential changes in angle of attack, which I term "feathering."

It is of importance that the pilot be able to determine and control the angles of attack of the liftscrew blades, both in the sense of "pitch-change" and in the sense of "feathering."

It will be evident that changes of the angles of attack, pitch changes, are effected only at the will of the pilot and when the rate of ascent or descent of the machine is to be altered. Furthermore, such changes need not be effected with great rapidity, it being sufficient if a pitch change is completed in a second or so; that is, in the time occupied by several revolutions of the liftscrew. With feathering it is otherwise, since each blade must go through a full cycle of change of angle of attack in each revolution, rising to its maximum angle when it is retreating and falling to its minimum angle when it is advancing.

In operation, the roots of the liftscrew blades are subject to enormous centrifugal forces, the force on each blade in a high-speed one-passenger machine being of the order of 100,000 pounds. To withstand this force such bearings as it is transmitted through must be very heavy and have large bearing surfaces, which makes for large friction.

For pitch change, since the angles of attack of all blades increase or decrease together, each blade must turn about its own axis relatively to the opposite blade. This makes a twist bearing or journal imperative. Since such pitch change does not take place frequently or rapidly nothing is lost by arranging to have it occur in a bearing of large surface under great centrifugal pressure. But if the rapid changes required for feathering were to take place in such a bearing, substantial amounts of power would be absorbed in the bearing and inordinately heavy links would be required to operate it. These effects constitute a severe limitation on the power input to such a liftscrew.

It is therefore important that the bearing about which feathering takes place shall be subjected to a minimum of large centrifugal forces.

It is a feature of my invention to separate the two types of change of angle of attack from one another, providing a separate bearing for each. I arrange to have the pitch change take place in a heavy bearing which is strong enough to withstand the enormous centrifugal forces and at the same time, in a hub of novel construction, I provide a pivot about which two oppositely placed blades may rock with the hub as though they constituted a single rigid member. This prevents centrifugal force from reacting on the feathering pivot and the pitch change bearing is not moved during feathering. The moments of inertia of the blades about the axis of rotation being balanced, the pivot is not subjected to centrifugal forces and may be of such light construction that even when it is rapidly rocked through an angle of ten degrees or more the absorption of power is negligible and there is no noticeable heating.

Torque is required to rotate the liftscrew through the air, and out of this torque arises the desired thrust or lift and the unavoidable drag. The lift tends to bend the liftscrew blades upward out of their plane of rotation and the drag tends to bend them backward against the direction of rotation. Both of these forces give rise to considerable bending strains at the roots of the blades, and difficulties accompany any attempt to support these strains on the same bearings which support the centrifugal strains.

Accordingly, my invention conemplates a further separation of bearing functions in which the heavy journal bearing which supports the centrifugal strains is entirely relieved of the bending strains due to lift and drag, the latter being wholly supported on torque-arms which are unitary with the central pivoted hub and extend through the centrifugal bearings into the blades themselves.

The torque required to rotate the liftscrew through the air is accompanied by a reaction on the nacelle or body of the machine which, were it not somehow taken care of, would cause the nacelle to spin in the opposite direction to the liftscrew. There are various ways of compensating for this torque reaction. The way I prefer is to provide two liftscrews, either side by side or in coaxial arrangement, rotating in opposite directions; but my invention is in no sense limited to a machine of the two-screw type, being equally useful in the case of a single-screw machine, the torque-reaction being otherwise compensated for.

A subsidiary feature of my invention has to do with the control mechanism whereby, in the case of coaxial liftscrews, I control the pitch change and feathering of the upper one as well as the lower one from the cock-pit.

When a machine of this character is accelerated or decelerated in a horizontal direction by alteration in the amount of feathering, unbalanced aerodynamic and gyroscopic forces come into play which tend to make the rotating liftscrew tilt out of its proper plane. In order to counteract this tendency and absorb the gyroscopic forces aerodynamically instead of structurally, I provide in my novel hub a second pivot, placed in a plane perpendicular to the first or rocking pivot, and about which the two balanced blades may tip with a "see-saw" motion.

Generally speaking, high pitch of the blades is desired for rapid vertical ascent and high engine torque is required for the same end. By a novel arrangement according to my invention the actual exertion of increased torque by the engine automatically produces an increase of blade pitch within limits manually controlled by the pilot. The manual control of these limits gives the pilot a certain "feel" of his machine which is of itself an advantage.

At the same time, it is desirable that if the engine torque should cease, for example due to engine failure, the liftscrew should be permitted to continue its rotation and its blades come quickly to a small angle of attack suitable for autorotation. My invention includes simple and reliable automatic means for accomplishing such quick return to the autorotative condition immediately upon the cessation of engine torque.

More particularly, the invention consists in the novel construction and combination of parts hereinafter described, illustrated in the accompanying drawings and defined in the claims hereto appended; it being understood that various changes in form, proportion, size and minor details of construction within the scope of the claims may be resorted to without departing from the spirit or sacrificing any of the advantages of my invention.

For a clearer comprehension of the invention reference is directed to the accompanying drawings which illustrate preferred embodiments thereof, wherein.

Figure 1:
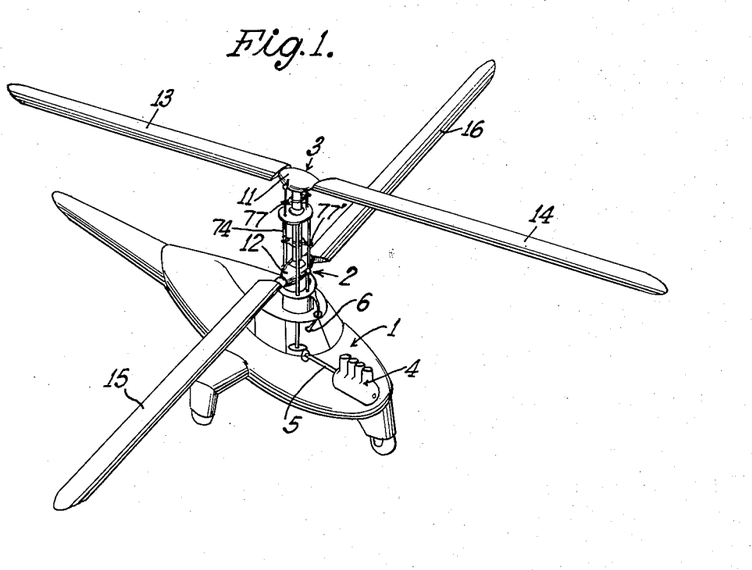
Fig. 1 shows in perspective an aircraft embodying my invention, with two liftscrews placed coaxially and arranged for rotation in opposite directions.
Figure 2:
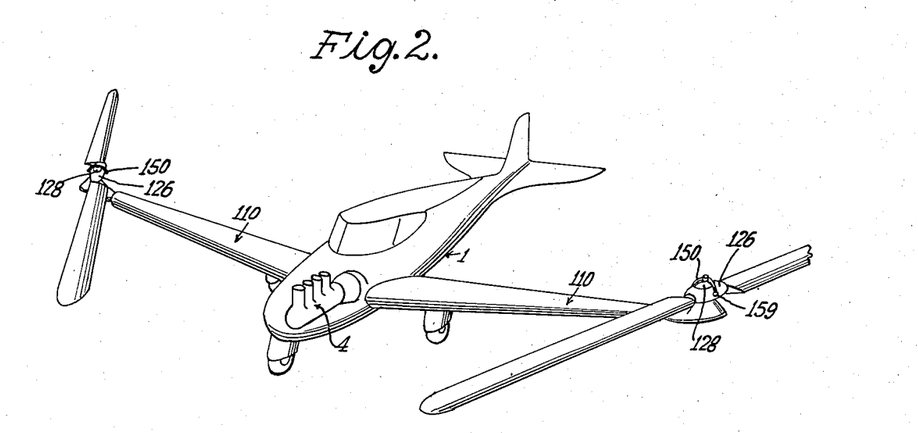
Fig. 2 shows in perspective an aircraft embodying my invention in which two liftscrews, arranged for rotation in opposite directions, are mounted side by side.

Referring now to the drawings, Figs. 1 and 2 show two different arrangements embodying my invention, Fig. 1 having the liftscrews arranged side by side. Each of these arrangements will now be described in detail.

In Fig. 1, I is the body or nacelle of the machine which supports or is supported by two two-bladed liftscrews 2 and 3 and contains an engine 4 and drive shaft 5 to drive the liftscrews and a terminal member 6 of a system of links for controlling the angles of the blades.

Figure 3:
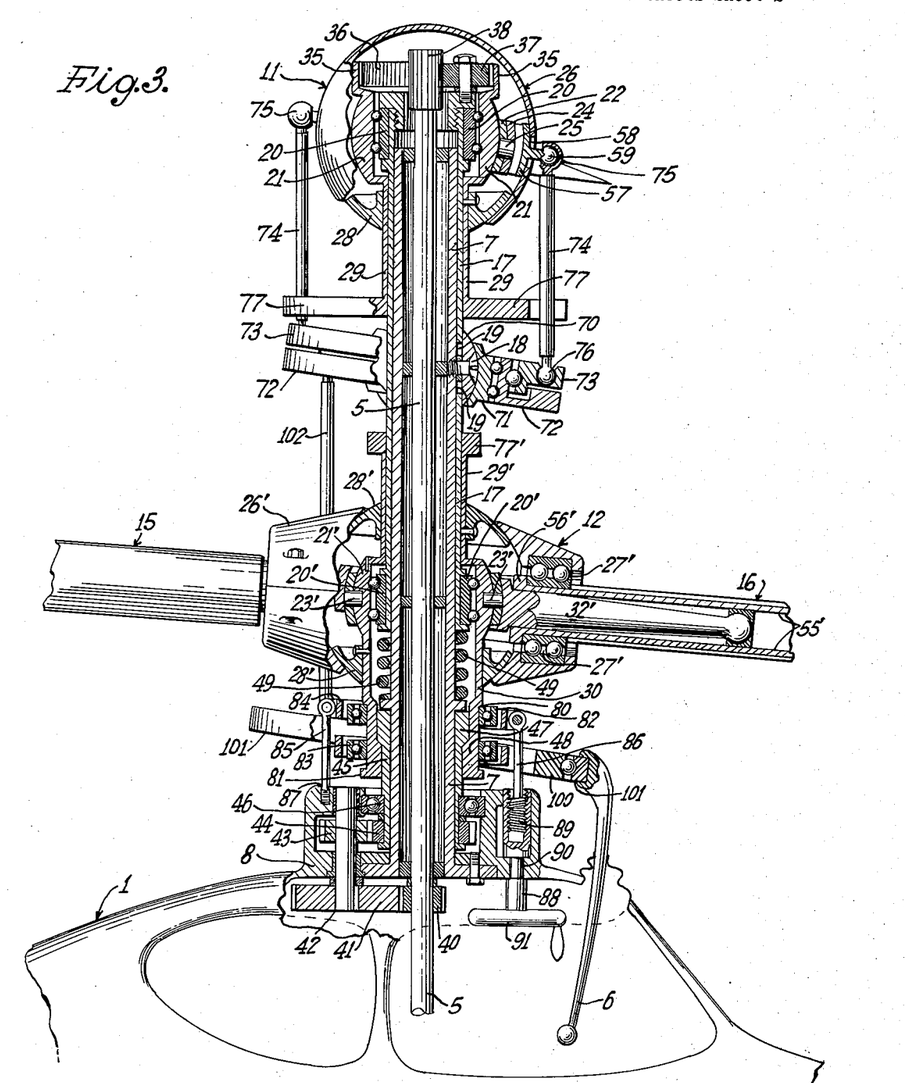
Fig. 3 is a side view, partly in section, of a part of the aircraft of Fig. 1, showing in detail the hub construction and controls of this embodiment of my invention.

Fig. 3 shows in detail the construction, drive and controls of the coaxially placed liftscrews of Fig. 1. A hollow tubular mast 7, through the full length of which the drive shaft 5 passes, is rigidly secured to a casing 8 mounted on the nacelle 1. One two-bladed liftscrew is mounted on a special hub 11 at the top of this mast for rotation in one direction and a second similar two-bladed liftscrew is mounted half way up the mast on a similar hub 12 for rotation in the opposite direction. In the position shown in Fig. 3, the two liftscrews are crossed, the blades 13, 14 of the upper liftscrew projecting sideways of the machine and the blades 15, 16 of the lower liftscrew projecting fore and aft. Fig. 1 shows the aircraft with its blades in the reverse position.

The construction of the liftscrew hub of my invention will now be described in detail. Surrounding the tubular mast 7 and extending below the upper hub 11 is a sleeve 17 arranged to slide vertically on the mast 7 but withheld by pins 18, fixed to the mast and passing through slots 19 in the wall of the sleeve, from rotating about the mast. Rigidly secured near the upper end of this sleeve 17 and at the level of the center of the hub is the inner race 20 of a circular ball bearing. About this inner race 20 an outer race 21 is arranged to rotate in a plane perpendicular to the mast. The periphery of this outer race is preferably cut in the form of a segment of a sphere. An outer sleeve 29 depends from the outer race 21 and is arranged to rotate about the inner sleeve 17.

Figures 4, 5, 6, 7:
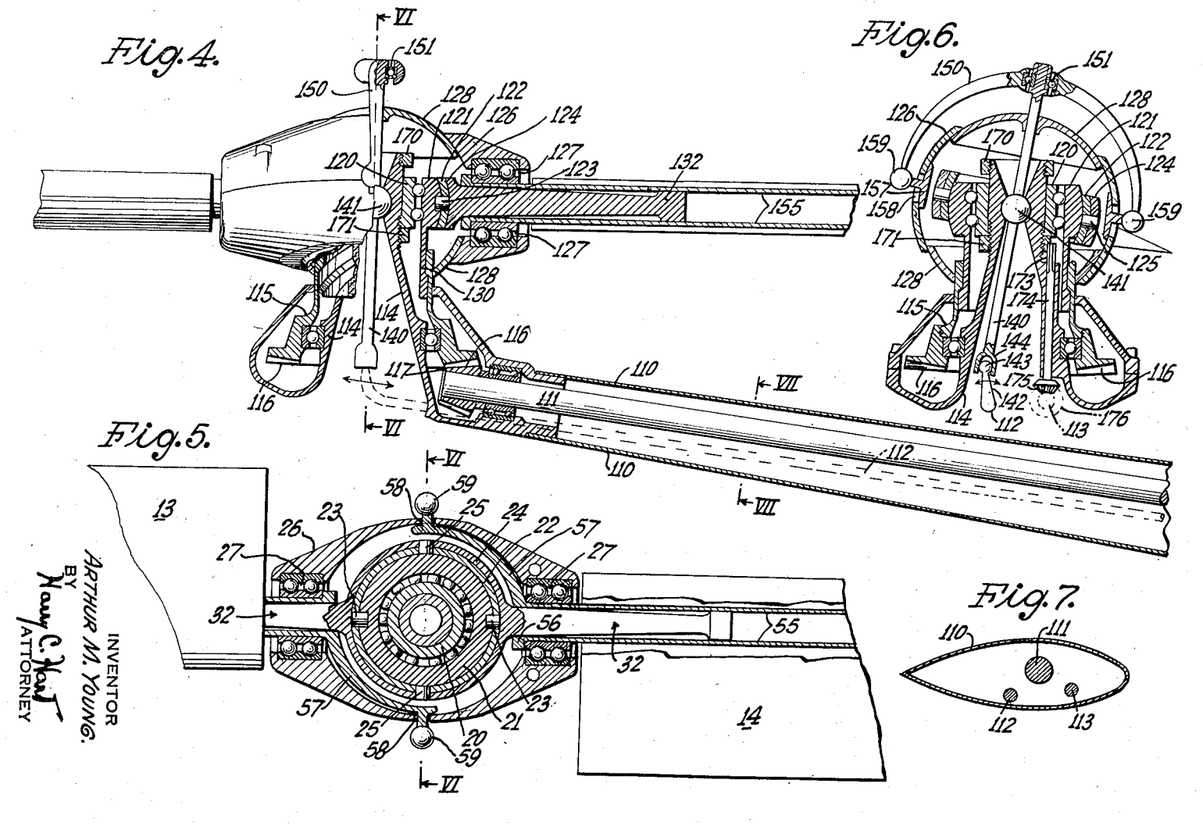
Fig. 4 is a front view, partly in section, of a part of Fig. 2, showing a different hub construction, controls and driving mechanism.
Fig. 5 is a plan view, partly in section, of the hub of my invention.
Fig. 6 is a sectional view, taken along the lines VI, VI of Figs. 4 and 5.
Fig. 7 is a cross sectional view of the rotor-supporting spar of Fig. 2 taken on the line VII, VII of Fig. 4.

Referring now to Fig. 5, many of the parts of which are alike for the construction of Figs. 3 and 4 and have like reference characters, a ring 22, cut internally in the form of a sphere, slightly larger than the external spherical surface of the outer race ring 21 is pivoted to the race ring 21 at two diametrically opposite points by pins 23 which permit it to rock about the race ring 21 but require it to turn therewith. This ring 22 is preferably also cut to a spherical form on its outer surface and about it, again with a spherical inner surface, is another ring 24 pivoted by pins 25 to the first ring 22 in the same manner that the first ring 22 is pivoted to the race 21. This second pair of pivots 25 lie on a line at right angles to the first pair of pivots 23 thus providing a universal joint. As such it is capable of transmitting torque about the mast axis while permitting a rocking motion about any axis perpendicular thereto.

The outer ring 24 is provided at diametrically opposite points with extension arms 32 arranged to resist the bending strains which come into play in operation.

A hollow casing 26 surrounds all the rings. This casing, preferably of ovoid shape, is provided with substantial internal thrust bearings 27 at the ends of its longer diameter. It is open at the bottom and the opening is internally cut to spherical form and fits snugly about a spherical shell 28 which is rigidly attached to the outer sleeve 29, and therefore rotates and rises and falls with the casing 26 but does not tip.

Referring to the lower part of Fig. 3, in which parts which are like parts in the upper hub are indicated by the same numerals with primes, the sliding sleeve 17 extends downward to the lower hub 12 and is there attached to the inner race 20' of a ball bearing which may be identical with the upper one. Inner and outer ball races, and inner and outer pivoted rings are arranged in the same fashion as in the upper hub, the outer ring being provided with strain-supporting arms 32'. An outer sleeve 29' extends upwardly from the outer race 21' and a drive sleeve 30 is attached to the lower part of this outer race 21' and hangs down below it. This drive sleeve 30 may be integral with the outer race or may be otherwise rigidly attached thereto.

The casing 26' of the lower hub 12 of Fig. 3 is identical with that of the upper hub 11 with the sole exception that, instead of being closed at the top, it is open at the top and provided at the upper opening as well as the lower opening with an internal spherical surface, and that two hemispherical seals 28' about which the casing 26' may slide, are attached to the outer sleeve 29' instead of one.

Fig. 3 shows the upper hub 11 in such a position that the blades of the liftscrew extend perpendicular to the plane of the paper and the lower hub 12 in such position that the blades of its liftscrew lie in the plane of the paper. Together they show all details of the universal joint.

The driving mechanisms for upper and lower liftscrews will now be described.

The outer or rotating race 21 of the upper ball bearing is provided with an upwardly extending ring 35 having gear teeth 36 cut on the internal face thereof. Mounted at the upper surface of the inner sleeve 17 are idler gears 37, which may conveniently be three in number, one being shown in Fig. 3, which mesh with a pinion 38 rigidly attached to the upper end of the drive shaft 5 which extends throughout the length of the mast 7 from the nacelle 1 below.

From this construction it will be evident that clockwise rotation of the drive shaft produces counterclockwise rotation of the outer ball race and therefore of the universal joint as a whole, and vice versa.

Rigidly attached to the drive shaft 5 just below the foot of the mast 7 is a gear 40 which meshes with another gear 41 mounted on an idler shaft 42 supported in bearings in the casing 8.

A pinion 43 on the upper end of this idler shaft 42 meshes with a gear 44 mounted at the lower end of a sleeve 45 which may rotate about the mast but is restrained from moving vertically thereon by a bearing 46. The upper end of this sleeve 45 is cut on its outer surface in the form of a heavy, steep pitch thread 47. This thread meshes with a corresponding thread 48 cut on the inner surface of the drive sleeve 30 which hangs down from the outer ball race 21'. This construction enables the outer sleeve 30 to spiral upward or downward about the inner sleeve 45. A spring 49 urges the outer sleeve 30 upward, and thus acts in opposition to gravity when the machine is resting on the ground and in the same sense as gravity when the machine is suspended from its liftscrews.

For a purpose later to be described it is advisable to provide a free-wheeling mechanism such as an over-running clutch for the drives of both the upper and lower liftscrews. Such freewheeling mechanism may be of any well known character and, if provided between the drive gears of the lower hub and the engine, a single such mechanism may serve both liftscrews.

A rigid tube 55 extends throughout the length of each liftscrew blade and beyond its inner end into the end of the ovoid casing 26 and there terminates in a flange 56 which bears upon the thrust bearing 27 of the casing 26 and is capable of supporting the high centrifugal forces which develop in operation. The arms 32 which are integral with the outer ring 24 of the universal joint extend inside of these tubes 55 and bear on the inside surfaces thereof to support bending stresses, thus relieving the end of the tube of all strains except strains in tension.

An arc shaped arm or bracket 57 extends from the inner end of this tube 55 one quarter way around the universal joint inside the casing 26 and there turns through an angle, extends through a hole 58 in the side of the casing and terminates in a knob 59.

A spherical knob 70 is attached to the mast 7 by the pins 18 half way between the upper and lower hubs. The space between the knob and the mast provides a guide for the sleeve 17.

A ring member 71, spherically cut on its inner surface to conform to the outer surface of the spherical knob 70, is arranged to rock about the knob in any direction.

The outer surface of this ring 71 constitutes the inner race of a ball bearing. About it an intermediate ring 72 may rotate, being compelled to remain in the same plane as the inner ring by a ball bearing. An outer ring 73 is similarly arranged to rotate about the inner ring, maintaining the same plane as the inner and intermediate rings.

Rigid rods 74 connect the knobs 59 of the blade brackets of the upper liftscrew to the outer ring 73. They may conveniently be provided with socket joints 75 at their upper ends to engage the knobs 59 of the blade brackets 57 and with balls 76 on the lower ends to fit snugly into corresponding spherical cavities in the upper surface of the outer ring 73. Similar rods connect the knobs of the brackets of the lower liftscrew to the intermediate ring 72.

A guide is provided for the upper liftscrew control rods in the form of a fork 77 solidly fixed to the outer sleeve 29 in a plane perpendicular to the mast. The upper control rods 74 pass between the prongs of this fork. This construction maintains the guide fork 77 always in phase with the upper liftscrew, so that the control rods which pass between the prongs of the latter always remain parallel with the mast. This, in turn, assures that rotation of the outer member 73 of the control ring is in phase with rotation of the upper airscrew.

A similar guide fork 77' is attached above the lower liftscrew to the sleeve 29' and serves in like manner to maintain the correct phase relationship between the lower liftscrew and the intermediate member 72 of the control ring.

The lower end of the sleeve 30 which depends from the outer race 21' of the lower hub is cut on its outer cylindrical surface to provide an upper shoulder 80 and a lower shoulder 81. Two ball bearings 82, 83, mounted for vertical movement with respect to the casing 8, surround the sleeve 30 between its shoulders and serve as stops against excessive vertical movement. The upper ball bearing 82 by contact with the upper shoulder 80 of the sleeve 30 provides a stop against downward motion of the sleeve. This stop 82 is adjustable in height, by the following construction. The inner race may turn with the sleeve 30. The outer race is surrounded with a ring 84 and pivoted thereto at two diametrically opposite points by pins, in a plane perpendicular to the plane of the paper. On a line perpendicular to the diameter containing the pins, this outer ring has fixed thereto two links, one of which 85 is fixed to the casing 8 at 87 and the other of which 86 terminates in a screw thread. A spindle 88 terminating in a hollow threaded extension 89 and supported in the casing 8 by a bearing 90, terminates in a conveniently placed handwheel 91. The threaded portion of the spindle 88 engages with the threaded end of the link 86. Thus rotation of the handwheel 91 produces vertical motion of the link 86 and tilting of the outer ring 84 about its pivots and therefore vertical motion without tilting of the ball bearing 82. The lower ball bearing 83 provides a stop against upward motion of the sleeve 30 in like manner. Though for the sake of simplicity the details are not shown on the drawing, its construction and adjustment arrangements are the same as described in connection with the upper stop 82.

Below the lower hub and surrounding the mast, there hangs a pilot ring 100 which constitutes the inner race of a ball bearing. It may rotate within an outer race 101 to which is attached a handle 6, and which normally tilts but does not rotate. This ring is supported at four points by rods terminating in balls which fit into sockets in the pilot ring. Two of these rods, one on either side of the hub, are extensions of the rods which connect the knobs of the lower blade brackets to the intermediate race 72 of the control ring. The other two, 102 connect the inner race 100 of the pilot ring directly to the intermediate race 72 of the control ring. This construction, in cooperation with the lower fork 77', results in maintaining the pilot ring in phase with the lower liftscrew.

From the above description it will be seen that a number of different motions are permitted to each liftscrew. If the universal joint in the hub remains fixed in orientation, the angles of attack of its two blades may be simultaneously increased or decreased when the sleeve 17 bearing the universal joint is raised or lowered in relation to the control ring. In such case, the blade root bearings or journals 27, 27' both rise or fall, but the knobs 59, 59' at the ends of the blade brackets 57, 57' remain fixed in height, and the blade tubes 55, 55' are thus twisted in the journals 27, 27' and about the ring arms.

If, on the other hand, the sleeve 17 and universal joint are maintained at a given height and the control ring 71, 72, 73 tilted about its spherical support 70, then both blades and hub rock together as a unit. When, in the case of the upper liftscrew, the control ring is tilted as shown, then the inner and outer rings 22, 24 will rock together about the pins 23, and the angle of attack of one blade will be increased and that of the other blade decreased to the same extent, producing a feathering action. If, on the other hand, the liftscrew lies in the plane of the paper, as in the case of the lower hub of Fig. 3, then tilting of the control ring in the manner shown has no direct effect on the hub since the only direct connection between the control ring and this hub is through links which have not moved by the tilting. However, tilting of the control ring in a lateral direction will produce feathering of the blades of the lower hub, leaving the upper blades unaffected.

No matter what the orientation of the liftscrews in the horizontal plane, that is to say, whether the blades extend sideways, fore and aft, or in any direction between, and no matter what the angles of attack of the blades of each liftscrew, whether alike for vertical motion or feathered for horizontal motion, each hub, and therefore each liftscrew, may swing freely about a horizontal axis perpendicular to its own axis, the outer ring 24 of the hub rocking about the inner ring 22 on the pins 25.

The operation of a machine as shown in Figs. 1 and 3 will now be understood, and is as follows. The machine being on the ground and supporting the weight of the liftscrews, the sleeve 30, impelled by gravity, seeks its lowest position and spirals about the sleeve 45. This draws each of the universal joints as a whole downward until the shoulder 80 strikes the adjustable stop 82. Since the knobs 59 at the ends of the wing brackets are held in place by the rods 74, the blade-supporting tubes 55 and with them the blades twist in the journals 27 in such a sense as to give the blades a high angle of attack.

The liftscrews are now in condition for starting vertical ascent. The pilot ring 100 is adjusted to a horizontal position. The engine 4 being started, torque is delivered through the drive shaft 5 to both the lower and upper liftscrews. Due to the gearing arrangements shown the liftscrews turn in opposite directions. Through the steep-pitch thread, the motor torque acts against the spring 49 to draw the sleeve 30 downward still more firmly and maintain the high angle of attack of the blades. As the liftscrews come up to speed they provide a lift which tends to move the sleeve 30 spirally upward on the steep-pitch thread, but the drag of the rotating blades is such that the engine torque holds the sleeve 30 down against the adjustable stop 82 even until after the lift has exceeded gravity and the machine is rising vertically.

For maximum speed of ascent full power is supplied to the drive shaft 5 and the blades are permitted to adopt the highest angle of attack by lowering the adjustable stop 82. To decrease the speed of vertical ascent, hover, or descend slowly, the pilot may throttle down the engine whereupon the driving torque on the steep-pitch thread is largely relieved and the sleeve 30, acted upon by the lift of the rotor and also by the force of the spring 49, spirals upward on the steep-pitch thread, until the lower shoulder 81 strikes the lower stop 83. This stop is so placed that when the lower shoulder 81 of the sleeve 30 is against it, the blades adopt a low positive angle or even a negative angle and the liftscrew thus passes easily into the state of autorotation, whereupon the pilot may by turning the handwheel 91 move the adjustable stop 82 into a higher position. If now power is again supplied to the shaft 5, the engine torque will draw the sleeve downward about the spiral thread, against gravity and the spring 49, and the blades will adopt a positive angle of attack which, however, will be not so great as before and the speed of vertical ascent will have been decreased or reduced to zero, as desired. In actual operation the pilot need throttle the engine only so much as will enable the handwheel to be turned and the lower stop moved up. This gives him a desirable "feel" of the machine.

While the machine is in the state of autorotation, the engine being throttled down, the liftscrews may overrun the drive shaft. It is to permit them to do so that the free wheeling device or over-running clutch is provided between engine and liftscrews, as well as to permit autorotation to continue in case of complete engine failure.

The machine being now at a substantial height above the ground, and the pilot wishing to initiate forward flight, he manipulates the handle 6 and tips the pilot ring 100, 101 forward and downward into the position shown in Fig. 3. The link rods communicate the motion of the pilot ring to the control ring 71, 72, 73 and maintain the latter in the same orientation as the former.

When both of these rings are tipped forward and downward in the position shown, the link rods which actuate the universal joints to control blade angles are drawn downward when forward, pushed upward when in the rear, and remain at their original height when on either side of the mast. This results in decreasing the angle of attack of the advancing blade and increasing the angle of the retreating blade, while leaving unaffected the angles of blades which extend fore and aft. Thus each blade passes through a cycle of angle change in each cycle of rotation, rising to a maximum as it retreats and falling to a minimum as it advances. The whole motion takes place in the universal joint, the casing and the two blades of each liftscrew rocking as though they were a single unit. The motion here described in detail is the "feathering motion" earlier alluded to.

When the blades of the liftscrews are first placed in this feathering position by manipulating of the pilot ring as above described, the lift of the retreating blade is at first increased and that of the advancing blade decreased, thus providing a torque on each liftscrew in such a direction as to tip it sideways. However, since the rotor is a rapidly rotating mass, gyroscopic effects appear and the direction of tip is not the same as the direction of the tipping force, but at 90° thereto, and the airscrew tips down in front and up at the rear, undergoing a see-saw motion about the pins 25. This see-saw motion, though not essential, is desirable, since it removes all bending strains from the liftscrew and at the same time permits it to behave in the manner of a free gyroscope, unaffected by the pendulous weight of the machine below it.

In addition to an increased lift, the retreating blade has also an increased drag. Likewise the advancing blade, in addition to a decreased lift, has a decreased drag. Since the liftscrews are turning in opposite directions, the resulting couples are balanced leaving only a net forward propulsive force, and the machine therefore proceeds to accelerate in a forward direction and continues to do so until the differences in drag on advancing and retreating blades are equalized, whereupon it continues in forward flight at a uniform speed. When this condition is reached, the forward tilt of the plane of rotation of the blades largely disappears, the tilt of the control ring, which remains, being reflected in feathering of the blades.

To turn, the machine should, preferably, have a rudder, but the turn is greatly facilitated by banking, which the pilot may induce by rocking the handle 6 sideways and so tipping the pilot and control rings up at one side and down at the other side. This affects the blades of both liftscrews through the universal joint in the same manner as above described in connection with forward flight with the exception that the blades have their angles increased or decreased when they are front and rear positions respectively.

To decelerate and stop forward motion the pilot merely tips the pilot ring in the opposite direction, thus increasing the angle of the advancing blade and decreasing the angle of the retreating blade. As described above in connection with forward flight the couples of the two liftscrews are balanced and the result is a net retarding force.

Referring now to the second embodiment of the invention illustrated in Figs. 4 and 6, this arrangement is particularly adapted to use with a machine in which the liftscrews are placed side by side instead of coaxially. Figs. 4 and 7 show in section a stream-lined spar 110 through which pass the drive shaft 111 and two control shafts 112, 113. At the outer end of the spar 110 a casing 114 is fixed, about which a sleeve 115 rotates in ball bearings. The lower end of the sleeve 115 is provided with a bevel gear 116 meshing with a bevel pinion 117 fixed to the end of the drive shaft 111. The inward portion of the casing 114 extends upwardly and is provided at its upper end with a cylindrical surface about which the inner race 120 of a ball bearing may slide vertically. The outer race 121, which may rotate about the inner race 120, bears the pins 123 about which the ring 122 may rock. This ring in turn bears pins 125, mounted on a line at right angles to the line joining the pins 123 about which rock the outer ring 124 bearing the arms 132. The construction of the universal joint so formed, as also of the casing 126, seals 128, blades and blade tubes 155 and their bearings 127, may be identical with that above described in connection with the coaxial arrangement of Fig. 3.

Depending from the outer race 121 of the ball bearing is a sleeve 130 cut on its outer surface in the form of a steep-pitch thread which meshes with a similar thread cut on the inner surface of the driving sleeve 115.

A rod 140 extends upward centrally of the casing and is supported at the level of the universal joint by a ball 141 which engages in a socket in the casing 114. This rod is free to rock in any direction about its ball and socket joint and may be rocked by the control rod 112 which terminates in an upwardly extending finger 142 bearing a ball 143 at its end which fits into a cylindrical socket 144 in the lower end of the rod 140. Moving the control rod 112 back and forward rocks the rod 140 in the plane of the paper as indicated in Fig. 4; and twisting the control rod 112 rocks the rod 140 in a plane perpendicular thereto as indicated in Fig. 6.

A yoke 150 is mounted in ball bearings 151 at the upper end of the rod 140 to rotate freely about an axis which always remains coincident with the rod 140. The arms of this yoke 150 extend downwardly on either side of the casing 126 and engage the knobs 159 attached to the ends of the blade-feathering brackets 157 which extend through holes 158 in the sides of the casing 126. It will be seen that rocking the rod 140 either fore and aft or from side to side produces the same motions of the blades and therefore the same feathering action as does tipping the pilot and control rings of Fig. 3.

Changes of pitch are likewise produced in a manner similar to that shown in Fig. 3 and described above. The engine torque, acting through the spiral thread on the sleeve 115, draws the universal joint downward with respect to the machine as a whole and increases the angles of both blades of each liftscrew, the blades twisting separately in the casing journals 127 which sustain the centrifugal forces. When the engine torque is relieved either by throttling down or by failure, the lift of the liftscrew causes the sleeve 115 and universal joint to spiral upward with respect to the spar 110, thus reducing the angles of attack of both blades and placing them in autorotative position.

Manual adjustment of the blade angles for pitch purposes is accomplished in the following manner. The inner race 120 of the ball bearing may slide vertically on the casing 114 between an upper fixed stop 170 and a lower adjustable stop 171. This lower stop 171 is a ring, threaded on the inside and engaging with corresponding threads cut on the outer surface of the central casing 114. The ring 171 is provided with gear teeth on its outer surface which mesh with a pinion 173 attached to the end of a rod 174. This rod 174 is arranged to be rotated from the nacelle through mitre gears 175, 176 by a controlling rod 113.

As in the case of the coaxial machine of Fig. 3, when high torque is applied to the drive shaft 111, the inner race 120 bears down hard upon the ring 171, but when the power supplied is reduced the lift draws the inner race 120 up against the fixed stop 170, whereupon the pilot may by manipulation of the control rod 113 adjust the position of the ring 171 and therefore the pitch of the blades as desired.

The easy-feathering arrangement of my invention is peculiarly applicable to highly power-loaded machines, that is, machines in which the liftscrews are relatively small and turn at relatively high speeds. There are two reasons for this: first, the easy-feathering arrangement, by relieving the feathering pivot of centrifugal forces, removes the limitation on power input above referred to and for the first time brings a highly power-loaded machine within the realm of practical possibility; and second, the high centrifugal forces in the liftscrews themselves tend to stretch the blades out into a plane and eliminate the dihedral angle which characterizes the lightly loaded liftscrew of a machine such as the autogiro for example. If the dihedral angle were eliminated structurally, provision would have to be made at the roots to support the consequent strains; and if it were permitted to exist, the rocking of the liftscrew about its pivot would be a more cumbersome process. However, the peculiar advantages of my invention in one field of application are not to be taken as in any way restrictive of its scope, the invention itself being defined in the claims.

Though the easy-feathering feature to which my invention is primarily directed is limited to a rotor of not more than two blades, it will be evident that the mechanical arrangements and combinations of parts above described are well adapted to securing pitch change in a liftscrew of any number of blades and for automatically controlling the blade pitch by the engine torque within limits which are manually adjustable by the pilot through an arrangement which permits the pilot a desirable "feel" of the machine.

I claim:

1. In an aircraft of the rotary wing type the combination which comprises a support having a main axis, a hub arranged to rotate about said main axis, a universal joint mounting for said hub on said axis, two blades extending in opposite radial directions from said hub in a plane perpendicular to said main axis and rotatably journalled in said hub, means for rocking said hub and blades as a unit about the lengths of said blades for feathering, and means for individually rotating said blades about their lengths with respect to said hub for pitch change.

2. In an aircraft of the rotary wing type the combination which comprises a body, a support having a main axis mounted on said body, a hub arranged to rotate about said main axis, a universal joint mounting for said hub on said axis, a source of power, mounted in said body and connected to deliver torque to rotate said hub, two blades extending in opposite radial directions from said hub in a plane perpendicular to said main axis and rotatably journalled in said hub, means for rocking said hub and blades as a unit about the lengths of said blades for feathering, and means responsive to the torque of said source for individually rotating said blades about their lengths with respect to said hub for pitch change.

3. A liftscrew comprising a hub, mounted for rotation about a principal axis and pivoted to rock freely about a second axis perpendicular to said principal axis, a tension-supporting journal at each of two diametrically opposite points of said hub and in the line of said second axis, and a blade mounted in each of said tension-supporting journals for rotation about said second axis and extending outwardly from said hub in the line of said second axis, means for adjusting the angle of incidence of said blades whereby said hub and blades may rock as a unit and the blades may turn in said journals independent of said rocking.

4. A liftscrew comprising a hub, mounted for rotation about a principal axis and pivoted to rock freely about a second axis perpendicular to said principal axis, a tension-supporting journal at each of two diametrically opposite points of said hub and in the line of said second axis, and a blade mounted in each of said tension-supporting journals for rotation about said second axis and extending outwardly from said hub in the line of said second axis, said hub and blades being balanced about a third axis perpendicular to both of said named axes, whereby concurrent changes of blade angles for pitch change may take place separately from and independently of differential changes of blade angles for feathering.

5. A liftscrew comprising a hub, mounted for rotation about a principal axis and pivoted to rock freely about a second and a third axis, said two last named axes being mutually perpendicular and perpendicular to said principal axis, a tension-supporting journal at each of two diametrically opposite points of said hub and in the line of said second axis, and a blade mounted in each of said journals for rotation about said second axis and extending outwardly from said hub in the line of said second axis.

6. The combination of a liftscrew comprising a hub, mounted for rotation about a principal axis and pivoted to rock freely about a second and a third axis, said two last named axes being mutually perpendicular and perpendicular to said principal axis, a tension-supporting journal at each of two diametrically opposite points of said hub and in the line of said second axis, and a blade mounted in each of said journals for rotation about said second axis and extending outwardly from said hub in the line of said second axis, with means for rocking said hub about said second axis to effect differential change in the angles of attack of the blades for feathering, and separate means for individually rotating said blades in said tension-supporting journals to effect concurrent changes in the angles of attack of the blades for pitch change.

7. A liftscrew comprising a hub, mounted for rotation about a principal axis and pivoted to rock freely about a second axis perpendicular to said principal axis, a tension-supporting journal at each of two diametrically opposite points of said hub and in the line of said second axis, a blade mounted in each of said tension-supporting journals for rotation about said second axis and extending outwardly from said hub in the line of said second axis, said hub and blades being balanced about a third axis perpendicular to both of said named axes in a manner to permit said pivotal rocking to take place unaffected by centrifugal tensions, and means for driving said hub in rotation about said principal axis.

8. In a helicopter, the combination of a body, a mast mounted on said body, a sleeve arranged to slide axially on said mast, means for limiting said axial motion, a first ring fixed to said sleeve, a second ring arranged to rotate about said first ring concentrically therewith, a third ring pivoted to rock about a diameter of said second ring, a fourth ring pivoted to rock about said third ring on a diameter perpendicular to said first-named diameter, said fourth ring having diametral arms extending outwardly in a line perpendicular to the line of its pivots, a tube snugly surrounding each of said arms, a blade fixedly mounted on each of said tubes, a bracket attached to the inner end of each of said blades, means for rotating said second ring, means for raising and lowering said sleeve, and means for maintaining the mean height of the free ends of said brackets at a constant level.

9. The combination of claim 8 in which the means for limiting the axial motion of the sleeve are manually adjustable as to position.

10. In a helicopter, a body, a mast mounted on said body, a first sleeve arranged to slide axially on said mast, a first ring fixed to said sleeve, a second ring arranged to rotate concentrically about said first ring, a second sleeve attached to said second ring and provided with a steep pitch thread thereon, a third sleeve mounted to rotate about said mast and having a like steep pitch thread thereon engaging with the thread of said second sleeve, a spring arranged to urge said second sleeve into an upper position, a source of power mounted in said body and arranged to deliver torque to said third sleeve, said second and third sleeves constituting driving means for rotating said second ring about said first ring and automatic torque-responsive means for drawing said sleeve downward against said spring, a universal joint connected to said second ring, a casing connected to said universal joint, and adapted to tip in any direction about said second ring, to rotate with said second ring and to move vertically with said first sleeve with respect to said mast, tension-supporting journals in said casing, two blades mounted in said journals in a manner to rotate with respect to said casing about the axes of said blades, a bracket attached to each of said blades, and means for maintaining the free ends of said brackets at a fixed average height with respect to said mast.

11. In an aircraft of the rotary wing type, the combination which comprises a support having a main axis, two hubs, arranged coaxially to rotate in opposite directions about said main axis, a universal joint mounting for each of said hubs on said axis, two blades extending in opposite radial directions from each of said hubs in planes perpendicular to said main axis and rotatably journalled in said hubs, means for rocking each of said hubs and its blades as a unit about the lengths of said blades for feathering, means for constraining the rocking of said hubs to take place in synchronism with their rotation about said main axis and in prescribed phase, and means for individually rotating said blades about their lengths with respect to their hubs for pitch change.

12. In a helicopter, the combination of a body, a mast mounted on said body, a single sleeve arranged to slide axially on said mast, and means for moving said sleeve axially, two hubs arranged coaxially for rotation in opposite directions about said mast and for axial motion with said sleeve, means for driving said hubs in rotation about the mast, means associated with each of said hubs permitting it to rock about another axis, perpendicular to said mast, two blades extending in opposite directions from each of said hubs in a plane perpendicular to said mast and rotatably journalled in said hubs, means for constraining the rocking of said hubs to take place in synchronism with their rotation and in prescribed phase, means connected with said mast for individually rotating all of said blades in said hubs, two members associated with each of said hubs and maintained at a constant mean height with respect to said mast, a bracket linking each of said members to one of said blades to translate vertical motion of said hubs and sleeves into rotation of said blades in their journals for pitch change.

13. In an aircraft of the rotary wing type, the combination which comprises a body, two spars mounted on said body and extending to either side of said body, a support mounted on the free end of each of said spars and having a substantially vertical main axis, a hub arranged to rotate in a substantially horizontal plane about said support, a universal joint mounting for each hub on its support, two blades extending in opposite radial directions from each of said hubs in planes perpendicular to said main axis and rotatably journalled in said hubs, means for rocking each of said hubs and its blades as a unit about the lengths of said blades for feathering, and means for individually rotating said blades about their lengths with respect to said hubs for pitch change.

14. In an aircraft of the rotary wing type, the combination which comprises a body, a support having a main axis mounted on said body, a hub arranged to rotate about said main axis, a source of power mounted in said body and connected to deliver torque to said hub and rotate said hub, blades extending radially from said hub in a plane perpendicular to said main axis and journalled in said hub for rotation about their individual axes, means responsive to the torque of said power source for individually rotating said blades about their axes with respect to said hub for pitch change and manually adjustable means operable in flight for limiting the amount of said torque controlled variation.

15. In an aircraft of the rotary wing type, the combination which comprises a support having a main axis, a member universally jointed to said support and rotatable about said main axis, spokes rigidly fixed to said member and extending radially from said main axis, said spokes being adapted to serve as torque-transmitting bearings for blades, means for driving said member in rotation, a casing concentric with said member and having tension-supporting journals surrounding said spokes, blades mounted in said journals in a manner to pull against said journals under the action of centrifugal forces and to be driven in rotation about said main axis by said spokes, and means for driving said member.

16. An aircraft sustaining rotor assembly which comprises a support defining a principal axis, a universal joint mounted to rotate on said support, a liftscrew mounted on said universal joint to rotate about said support in a plane normally perpendicular to said principal axis but freely inclinable in any direction therefrom, said liftscrew comprising a hub and two blades extending in opposite directions from said hub, means for constraining said two blades to execute cyclic changes of angle of attack together as a unit about an axis in said blades in synchronism with the rotation of the liftscrew, means for adjusting at will and controlling the magnitudes of said unison angle changes, and means for separately altering the blade angles in like amounts for pitch change.

17. In an aircraft, a sustaining rotor assembly which comprises a support defining a principal axis, a universal joint mounted to rotate on said support, a liftscrew mounted on said universal joint to rotate about said support in a plane normally perpendicular to said principal axis but freely inclinable in any direction there from, said liftscrew comprising a hub and two blades extending in opposite directions from said hub, means for constraining said two blades to execute cyclic changes of angle of attack together as a unit about an axis in said blades in synchronism with the rotation of the liftscrew, a source of power in said aircraft, and means responsive to the torque of said source for separately altering the blade angles in like amounts for pitch change.

18. In an aircraft, a sustaining rotor assembly which comprises a support defining a principal axis, a universal joint mounted to rotate on said support, a liftscrew mounted on said universal joint to rotate about said support in a plane normally perpendicular to said principal axis but freely inclinable in any direction therefrom, said liftscrew comprising a hub and two blades extending in opposite directions from said hub, means for constraining said two blades to execute cyclic changes of angle of attack together as a unit about an axis in said blades in synchronism with the rotation of the liftscrew, means for adjusting at will and controlling the magnitudes of said angle changes, a source of power in said aircraft, and means responsive to the torque of said source for separately altering the blade angles in like amounts for pitch change.

19. In a helicopter having a vertical axis, rotors arranged to rotate in opposite directions around said axis, said rotors comprising blades so journalled as to be rotatable about their own longitudinal axes, control means comprising a first element mounted on said vertical axis and inclinable with respect thereto at the discretion of the operator, a second element mounted on the first element constrained to incline with it but free to rotate upon it, the rotation of this second element being constrained to follow the rotation of one of said rotors, a third element similarly arranged to rotate with said rotor on the side opposite to the second inclinable element, a plurality of links interconnecting said second and third elements so that they remain parallel at all times, a fourth element mounted on said third element, constrained to incline with it but free to rotate upon it, the rotation of this fourth element being constrained to follow the rotation of the other one of said rotors, and means interconnecting the blades of each rotor with the corresponding rotatable element to produce rotation of said blades about their longitudinal axes.

20. In a helicopter having a vertical axis, rotors arranged to rotate in opposite directions around said axis, one of said rotors comprising blades so journalled as to be rotatable about their own longitudinal axes, control means comprising a first element mounted on said vertical axis and inclinable with respect thereto at the discretion of the operator, a second element mounted on the first element constrained to incline with it, but free to rotate upon it, the rotation of this second element being constrained to follow the rotation of one of said rotors, a third element similarly arranged to rotate with said rotor on the side opposite to the second inclinable element, a plurality of links interconnecting said second and third elements so that they remain parallel at all times, a fourth element mounted on said third element, constrained to incline with it but free to rotate upon it, the rotation of this fourth element being constrained to follow the rotation of the other one of said rotors, and means interconnecting the blades of said first-named rotor with the corresponding rotatable element to produce rotation of said blades about their longitudinal axes.

21. In a helicopter having a vertical axis, an upper rotor and a lower rotor arranged to rotate in opposite directions around said axis, the upper one of said rotors comprising blades so journalled as to be rotatable about their own longitudinal axes, control means comprising a first element mounted on said vertical axis and inclinable with respect thereto at the discretion of the operator, a second element mounted on the first element, constrained to incline with it but free to rotate upon it, the rotation of this second element being constrained to follow the rotation of said lower rotor, a third element similarly arranged to rotate with said lower rotor on the side opposite to the second inclinable element, a plurality of links interconnecting said second and third elements so that they remain parallel at all times, a fourth element mounted on said third element, constrained to incline with it but free to rotate upon it, the rotation of this fourth element being constrained to follow the rotation of said upper rotor, and means interconnecting the blades of said upper rotor with said fourth rotatable element to produce rotation of said blades about their longitudinal axes.

22. In an aircraft of the rotary wing type, the combination which comprises a body, a support having a main axis mounted on said body, a hub arranged to rotate about said main axis, a source of power mounted in said body and connected to deliver torque to said hub and rotate said hub, blades extending radially from said hub in a plane perpendicular to said main axis, means for mounting said blades for variation of their aerodynamic incidence, torque responsive means for individually varying said incidence simultaneously for pitch change, and manually adjustable means operable during flight for limiting the amount of said torque-controlled variation of incidence of said blades.

23. In an aircraft of the rotary wing type, the combination which comprises a support having a main axis, a hub arranged to rotate about said main axis, a universal joint mounting for said hub on said support, two blades extending in opposite directions from said hub in a plane perpendicular to said main axis, means for mounting the blades on said hub for adjustment of incidence, means for rocking said hub and blades as a unit about the length of the blades for feathering, and means for increasing or decreasing the incidence of both blades simultaneously for pitch change.

24. In an aircraft of the rotary wing type, the combination which comprises a support having a main axis, a hub arranged to rotate about said main axis, a universal joint mounting for said hub on said support, two blades extending in opposite directions from said hub in a plane perpendicular to said main axis, means for mounting the blades on the hub for adjustment of incidence, means for rocking said hub and blades as a unit about the length of the blades for feathering, and torque responsive means operable during flight for increasing or decreasing the incidence of both blades simultaneously for pitch change.

ARTHUR M. YOUNG.